United States Patent
Kruse et al.

(10) Patent No.: US 10,826,749 B2
(45) Date of Patent: *Nov. 3, 2020

(54) EFFICIENT PROGRAMMATIC MEMORY ACCESS OVER NETWORK FILE ACCESS PROTOCOLS

(71) Applicant: Microsoft Technology Licensing, LLC, Redmond, WA (US)

(72) Inventors: David Matthew Kruse, Kirkland, WA (US); Lars Reuther, Kirkland, WA (US); Kevin Michael Broas, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/437,928

(22) Filed: Jun. 11, 2019

(65) Prior Publication Data

US 2019/0296957 A1 Sep. 26, 2019

Related U.S. Application Data

(63) Continuation of application No. 13/904,756, filed on May 29, 2013, now Pat. No. 10,404,520.

(51) Int. Cl.
*H04L 29/06* (2006.01)
*G06F 9/54* (2006.01)
(Continued)

(52) U.S. Cl.
CPC .......... *H04L 29/06197* (2013.01); *G06F 9/54* (2013.01); *G06F 2009/4557* (2013.01); *G06F 2209/541* (2013.01); *H04L 67/06* (2013.01)

(58) Field of Classification Search
CPC ..... H04L 29/06197; H04L 67/06; G06F 9/54; G06F 2009/4557; G06F 2209/541
See application file for complete search history.

(56) References Cited

U.S. PATENT DOCUMENTS 5,404,529 A * 4/1995 Chernikoff ............ G06F 9/4488
719/315
6,651,110 B1 * 11/2003 Caspers ............... G05B 19/042
710/115

(Continued)

OTHER PUBLICATIONS

"Summons to Attend Oral Proceedings Issued in European Patent Application No. 14734629.0", Mailed Date: Jul. 5, 2019, 2 Pages.

(Continued)

*Primary Examiner* — Azizul Choudhury

(57) ABSTRACT

Embodiments provide a method and system for transferring data between different computing devices. Specifically, a communication session is established between a first computing device and a second computing device. The communication session may be established using a first communication protocol. The first computing device creates a virtual memory object which is bound to one or more memory blocks of the first computing device. A path to the virtual memory object is generated and the path is transmitted to the second computing device using the communication session. The second computing device may then read or write data directly into/from the virtual memory object using a second communication protocol that is different from the first communication protocol. The data is written into and read from the virtual memory object using file system commands.

20 Claims, 8 Drawing Sheets

(51) Int. Cl.
G06F 9/455 (2018.01)
H04L 29/08 (2006.01)

(56) References Cited

U.S. PATENT DOCUMENTS

| | | | |
|---|---|---|---|
| 6,816,817 B1 * | 11/2004 | Retlich | H04L 63/1408 340/853.2 |
| 6,832,118 B1 * | 12/2004 | Heberlein | G05B 19/042 318/565 |
| 10,404,520 B2 * | 9/2019 | Kruse | G06F 9/54 |

OTHER PUBLICATIONS

"Office Action Issued in Brazilian Patent Application No. BR112015029220-8", dated Feb. 12, 2020, 5 Pages.
"Office Action Issued in Indian Patent Application No. 7179/CHENP/2015", dated May 12, 2020, 7 Pages.
"Office Action Issued in Indian Patent Application No. 7269/CHENP/2015", dated May 27, 2020, 8 Pages.

* cited by examiner

US 10,826,749 B2

EFFICIENT PROGRAMMATIC MEMORY ACCESS OVER NETWORK FILE ACCESS PROTOCOLS

CROSS-REFERENCE TO RELATED APPLICATIONS

This application is a continuation of and claims priority to U.S. patent application Ser. No. 13/904,756, now U.S. Pat. No. 10,404,520, filed May 29, 2013, entitled "EFFICIENT PROGRAMMATIC MEMORY ACCESS OVER NETWORK FILE ACCESS PROTOCOLS", which is hereby incorporated by reference in its entirety.

BACKGROUND

When transferring data between two different computing devices, the data to be transferred is typically written into a network buffer. The network buffer is then copied across the network using a network protocol and delivered to a destination computing device as a network packet. The network packet is then copied into memory at the destination computing device. Such file transfers are typically slow and require the data to be written in sequence which can be costly with respect to network bandwidth and system resources on both the source computing device and the destination computing device.

It is with respect to these and other general considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Embodiments provide a method and system for transferring data between a first computing device and a second computing device. Specifically, a communication session is established between the first computing device and the second computing device. The communication session may be established using a first communication protocol such as, for example, the Transmission Control Protocol/Internet Protocol (TCP/IP) communication protocol. To effectuate transferring large blocks of data, the first computing device creates a virtual memory object which is bound to one or more memory blocks of the first computing device. A path to the virtual memory object is generated, named, and transmitted to the second computing device using the established communication session. Once received, the second computing device may utilize the path to read data directly from or write data directly to the memory locations of first computing device associated with the virtual memory object. As will be set forth below, the data transmission (e.g., the reads and writes) is carried out over a second communication protocol that is different from the first communication protocol. In certain embodiments, the second communication protocol is a version of the Server Message Block (SMB) protocol by MICROSOFT Corp. of Redmond, Wash. The data is written to and read from the memory locations associated with the virtual memory object using file system commands that are transmitted over the second communication protocol.

Embodiments also provide a method and system for establishing a communication session between a first computing device and a second computing device using a first communication protocol, such as, for example, the TCP/IP communication protocol. Once the session is established between the first computing device and the second computing device, the second computing device sends a request to the first computing device to set up a virtual memory object. In response to the request, the second computing device receives a path to the created virtual memory object. In certain embodiments, the virtual memory object is bound to one or more memory blocks of the first computing device. Using the received path, the second computing device may read data directly from or transfer data directly to the memory locations on the first computing device via the virtual memory object. In embodiments, the data reads and writes are transmitted over a second communication protocol, such as, for example, a version of the SMB protocol. As will be discussed, the data is directly transferred to and read from the memory locations associated with the virtual memory object using one or more file system commands.

BRIEF DESCRIPTION OF THE DRAWINGS

Non-limiting and non-exhaustive embodiments are described with reference to the following Figures in which.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

As will be explained in detail below, the methods and systems described herein enable one computing device to access physical memory locations on another computing device using file system commands from an application programming interfaces (APIs) over a data communication protocol. In certain embodiments, the data communication protocol may support multiple channels though which data can be communicated between the different computing devices. As will be discussed, the use of multiple channels enables each of the computing devices to establish multiple connections through which data may be communicated. The use of multiple channels also enables bandwidth aggregation across each channel. Additionally, the data communication protocol may have various features already built in. Thus, an application running on one device can utilize custom features of the data communication protocol while still implementing file system commands known to the application. Such features may include authentication, auto negotiation, optimal path determination, encryption, compression and the like. The communication protocol may also be able to determine the number of channels to create and also determine which paths have the highest bandwidth and lowest latency for traffic between the two computing devices. The communication protocol could also utilize different underlying transports, such as, for example, TCP or Remote Direct Memory Access (RDMA), and auto-determine which is the most efficient.

Figure 1:
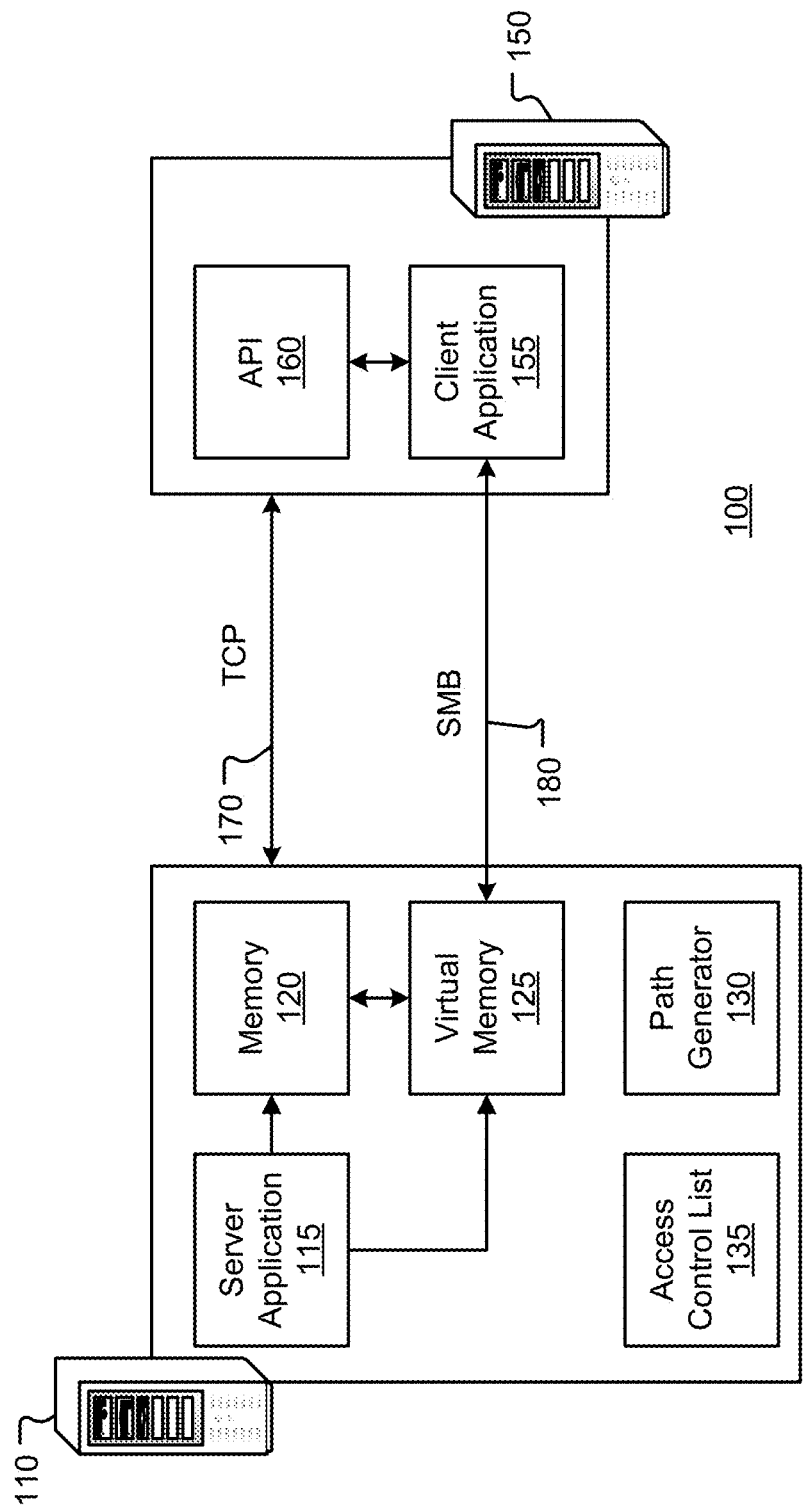
FIG. 1 illustrates a system for transferring data between a first computing device and a second computing device according to one or more embodiments of the present disclosure.

FIG. 1 illustrates a system 100 in which data may be transferred between a first computing device 110 and a second computing device 150 according to one or more embodiments of the present disclosure. In certain embodiments, the first computing device 110 may be a server computer and the second computing device may be a client computer, such as, for example, a personal computer, tablet, laptop, smartphone, personal digital assistant and the like. Although the first computing device 110 is shown and described as a server computer and the second computing device 150 is shown and described as a client computer, it is contemplated that the first computing device 110 could be a client computer and the second computing device 150 could be a server computer. Additionally, although FIG. 1 shows only one first computing device 110 and one second computing device 150, it is contemplated that there may be more than one first and second computing devices present in the system 100. Thus, the methods described herein with respect to FIG. 2-4 may be implemented by a server computer or a client computer or by multiple server computers or client computers. Alternatively or additionally, each of the first computing device 110 and the second computing device 150 could be client computers or server computers.

As shown in FIG. 1, the first computing device 110 may comprise a server application 115 that has access to one or more blocks of memory 120. In certain embodiments the memory 120 is local to the first computing device 110. In other embodiments, the memory 120 may be remote to the first computing device 110. In such cases, the memory 120 would need to be accessed by the first computing device using a data transfer protocol. As will be explained in detail below, the first computing device 110 may be configured to generate a virtual memory object 125 that is bound to one or more blocks of the memory 120. The first computing device 110 may also comprise a path generator 130 and an access control list 135 that controls access to the memory 120 and/or the virtual memory object 125.

As shown in FIG. 1, a communication session 170 may be established between the first computing device 110 and the second computing device 150 over a network (not shown). In certain embodiments, the communication session 170 is established using the TCP/IP communication protocol. Although TCP/IP protocol is specifically mentioned, it is contemplated that other communication protocols may be established between the first computing device 110 and the second computing device 150.

In certain embodiments, the server application 115 executes on the first computing device 110 and may be configured to set-up and handle data transfers and migrations between the first computing device 110 and the second computing device 150 based on a received request from the second computing device 150. For example, the second computing device may have an application, a virtual machine, messages, or other data that need to be transferred or migrated from the second computing device to the first computing device or vice versa. In certain embodiments, the server application 115 may be one of many different applications that are executed on the first computing device 115. For example, the server application 115 may be an operating system configured to oversee the entire operation of the first computing device 110. Alternatively, the server application 115 may be configured to organize received data into one or more databases resident on the first computing device 110.

Regardless of the configuration of the server application 115, the server application 115 has access to the memory 120. Thus, when the second computing device 150 requests to transfer data or migrate one or more programs or applications, the server application 115 may be notified of the desired transfer over the established communication session 170. When the notification is received, the server application 115 generates a virtual memory object 125. In certain embodiments, the virtual memory object 125 is then bound to one or more blocks of data in the memory 120.

As will be explained below, in certain embodiments, the virtual memory object 125 is set to contain properties similar to those in a typical file system. More specifically, the virtual memory object 125 is configured such that data may be written to the one or more memory blocks associated with the virtual memory object using file system commands known to one or more applications that request the data transfer. That is, the second computing device 150 may view the virtual memory object 125 as a file that can be accessed using, for example, various open, read and write commands.

The first computing device 110 may also include a path generator 130 that generates a path as well as a path name to the virtual memory object 125. Once the path is generated, the first computing device 110 may establish security features for the path using, for example, an access control list 135. For example, the access control list 125 can set up security features regarding which applications (either local applications or remote applications) can access the virtual memory object 125, which clients have write permissions to the virtual object 125 and the associated memory blocks, which clients have read only access, and which byte ranges or which blocks of memory are locked.

In certain embodiments, the first computing device 110 may communicate the path and the path name to one or more applications. In embodiments, the applications may be applications that are local to the first computing device 110. In other embodiments, the one or more applications, such as, for example, client application 155, may be executing remotely on the second computing device 150. In certain embodiments, the path name is shared with the second computing device 150 using the communication session 170. In embodiments where a system has multiple second computing devices 150, each of the second computing devices could communication to the same first computing device 110.

Once the client application 155 knows the path to the virtual memory object 125, the client application 155 may use one or more file system commands from a file system API 160 to access the virtual memory object 125. For example, the client application 155 may issue an "open" command established by the API 160 and transmit the open command across the second communication protocol 180 directly to the virtual memory object 125. In embodiments, use of the file 160 system API enables an upgrade to the performance or security at the system level without requiring application level changes.

In embodiments, the open command utilizes a pointer to access the memory blocks that are bound to the virtual memory object 125. As a result, the client application 155 may write data directly to a memory buffer associated with memory blocks that are bound to the virtual memory object 125. Specifically, the client application 155 may directly access the memory 120 of the first computing device 110 using the second communication protocol 180. As will be discussed in detail below, the second communication protocol 180 may support multiple channels. Thus, data may be directly read from or written to the memory 120 in parallel. Accordingly, one or more applications (either those running locally on the first computing device 110 or those running remotely on the second computing device 150) can submit multiple asynchronous requests. For example, in certain embodiments, an open command natively includes both read access and read-write access. Additionally, support may be given for sharing modes including exclusive, read-shared, and read/write shared modes. Through the use of these modes the client may express its desired access mode to the memory region which then enables the server to grant or deny the requested mode.

As discussed above, the virtual memory object 125 may be bound to one or more blocks of memory. In certain embodiments the blocks of memory may be contiguous blocks of memory or non-contiguous blocks of memory. For example, the virtual object 125 may be bound to memory region A that comprises block zero through block two and bound to memory region B that comprises memory block four through memory block five. Although the virtual memory object 125 may be bound to non-contiguous memory blocks, the virtual memory object 125 may appear contiguous to the client application 155. Thus, when the client application 155 writes data to the virtual memory object 125, the client application 155 may write the data sequentially. In contrast, the server application 115 may need to do a scattered write or a gathered read when reading data from or writing data to non-contiguous data blocks associated with the virtual memory object 125. Likewise, in some embodiments the different non-contiguous regions could be backed by a mix of virtual memory and physical disk if a system has limited memory resources.

In certain embodiments, the second communication protocol 180 establishes a communication session between the first computing device 110 and the second computing device 150. As discussed above, the second communication protocol is a file transfer protocol such as, for example, a version of the Server Message Block (SMB) protocol. In certain embodiments, the SMB session may be established at any point in time after the first communication session 170 is established. In another embodiment, the first communication session 170 may be an SMB session. In yet another embodiment, the SMB session may be established between the first computing device 110 and the second computing device 150 in response to the path being communicated from the first computing device 110 to the second computing device 150 or in response to the second computing device 150 submitting a request to the first computing device 110 to accept data transfer or a migration from the second computing device 150.

During the establishment of the SMB session between the first computing device 110 and the second computing device 150, a negotiation may occur to indicate that both the first computing device 110 and the second computing device 150 support multiple connections within a SMB session. This may include negotiating a version of the SMB protocol. In addition, the first computing device 110 and/or the second computing device 150 can also determine information about various interfaces and connections between the first computing device 110 and the second computing device 150. This includes the type of connection or channel and the speed of each connection or channel. Further, either the first computing device 110 or the second computing device 150 can sort the interfaces and connections by type and speed to determine the top interfaces. Thus, each of the first computing device 110 and the second computing device 150 can further determine which interfaces or channels should be used when additional channels are established to transfer data.

More specifically, one or more connection transports may be available between the first computing device 110 and the second computing device 150. For example, the first computing device 110 and the second computing device 150 may be connected by a variety of transports, such as Ethernet and Wi-Fi, as well as redundant connections of the same transport, such as multiple network interface cards (NIC). In addition, some connection transports may support capabilities such as RDMA that affect the speed of one connection transport over another.

Referring back to FIG. 1, as shown, the second communication protocol 180 enables the client application 155 to directly access the virtual memory object 125. Thus, the client application 155 can utilize one or more features of the second communication protocol when writing data directly to the virtual memory object 125. For example, in scenarios where the second communication protocol is a version of the SMB protocol, the client application 155 may utilize capabilities provided by the SMB protocol without creating new file system commands or reprogramming the file system commands utilized by the API 160 that are known to the client application 155 and/or the second computing device 150. Thus, the client application 155 can utilize commands such as open, read and write while still taking advantage of the capabilities of the SMB protocol including discovery, authentication, authorization, bandwidth aggregation, support for RDMA and TCP, zero copy over RDMA and the like.

Figure 2:
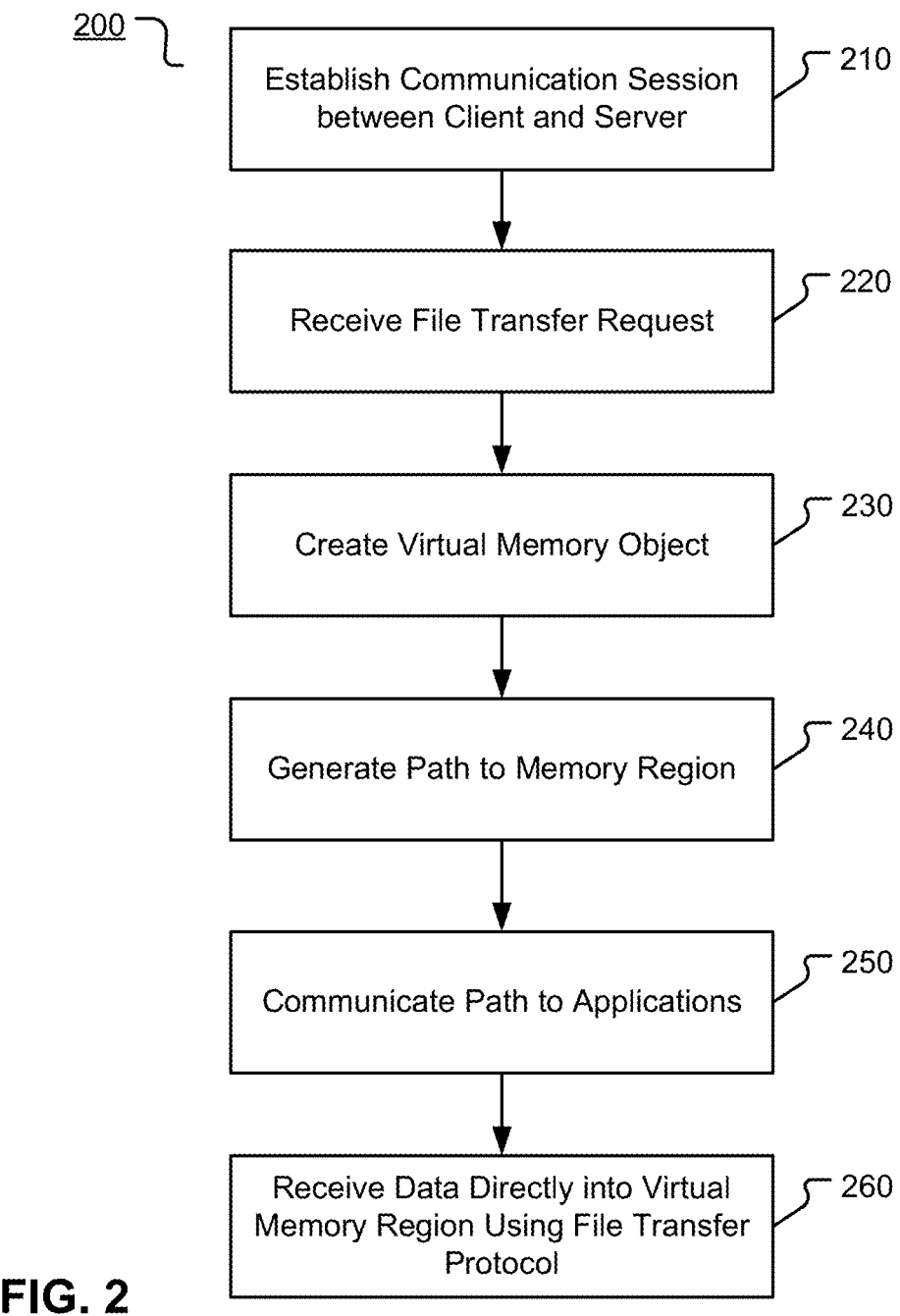
FIG. 2 illustrates a method for transferring data between a first computing device and a second computing device according to one or more embodiments of the present disclosure.

FIG. 2 illustrates a method 200 for transferring data between a first computing device and a second computing device according to one or more embodiments of the present disclosure. In certain embodiments, one or more of the first computing device 110 (FIG. 1) and the second computing device 150 (FIG. 1) may employ method 200 for communicating large blocks of data over a multi-channel data communication protocol.

Method 200 begins when a communication session is established 210 between a client and a server. Although a client and server are specifically mentioned, it is contemplated that the operations of the method 200 may be implemented between two or more clients or two or more servers. In certain embodiments, the communication session is established using the TCP/IP communication protocol. Although the TCP/IP communication protocol is specifically mentioned, one or more embodiments provide that the client and server may establish a communication session using specialized protocols or other out of band protocols.

Once the communication has been established, the server may receive a request 220 to accept file data or application data from the client. As will be explained below, the request may be a request to migrate a virtual machine from the client to the server. In another embodiment, the request may be a request to transfer a large volume of small amounts of data from the client to the server. In yet another embodiment, the request may be a request to transfer large chunks of data from the client to the server.

In response to the received request, the server creates 230 a virtual memory object. In certain embodiments, the virtual memory object is akin to a virtual file. Thus, just as a physical file can be accessed by an application using file system commands of a file system API (e.g., open, read, and write commands), the virtual memory object may be accessed by a remote application using similar file system commands that are transmitted over a data communication protocol. In yet another embodiment, the virtual file could be an array of smaller buffers with the file offset of a read or write indicating the index of the buffer to which the data should be written or read.

As part of the creation process, the virtual memory object is mapped and bound to one or more physical memory regions (or blocks) resident on the server. As part of the binding process, the server may register the one or more physical memory regions to help ensure that the memory is not overwritten by another application. Although the one or more physical memory regions are bound to the virtual memory object, one or more applications resident on the server may still access the physical memory regions as needed. As discussed above, the physical memory regions associated with each virtual memory object may be contiguous or non-contiguous or a combination thereof.

Once the virtual memory object has been created, mapped and bound to the one or more physical memory regions on the server, flow proceeds to operation 240 in which a path to the virtual memory object is generated. In certain embodiments, the path is generated by the server or by an application resident on the server. The path may include a file name or path name so it can be easily communicated to one or more local applications and one or more remote applications being executed on clients that have an established communication session with the server.

Operation 250 provides that the path is communicated to one or more applications. As previously discussed, the path is communicated to one or more remote applications. In another embodiment, the path name may be communicated to local applications. Although the path name may be communicated to the local applications, it is contemplated that the local applications can access the physical memory regions using traditional file access methods and do not need to utilize the path name. In another embodiment, once the path is established, all applications, either local applications or remote applications, may be required to utilize the path to access the physical memory regions associated with the virtual memory object. In certain embodiments, the path is communicated to the client or the remote applications using the established communication session of operation 210.

Once the path has been communicated to the applications, operation 260 provides that data from one or more remote applications is received directly into the virtual memory object using a file transfer protocol. As discussed above, the remote application communicates file system commands over the file transfer protocol to access the data in the physical memory regions associated with the virtual memory object. Thus, when the client application knows the path to the virtual memory object, the client application can issue open, read, and write commands against the virtual memory object. As a result, the above method may enable the remote application to utilize underlying features of the file transfer protocol, such as those discussed above (e.g., auto-discovery, negotiation, authentication, bandwidth aggregation, RDMA and TCP support, zero-copy over RDMA and the like) while still utilizing file access commands that are already known and utilized by the client application. It also enables the client and server to utilize these capabilities even when the application itself is not aware of what is available, and thus performance or security can be improved without requiring changes to the application.

In certain embodiments, the file transfer protocol is version 2 or higher of the Server Message Block (SMB) protocol. As discussed above, the SMB protocol may be configured to utilize multiple channels. As a result, when data is transferred from the client to the server, reads and writes may be transmitted in parallel over the various channels. Additionally, large reads and writes over SMB utilizing multiple channels and/or RDMA have zero copy functionality on both the source and the destination. Thus, data from the client to the server (or vice versa) may be transferred directly to or from application memory which eliminates the need to copy data between the application memory and data buffers in the operating system. As a result, transfers may require little or no work to be done by local processors, caches and the like.

The following is an example embodiment in which method 200 may be utilized. For example, there may be a plurality of processes running on two different nodes (e.g., a source node and a destination node). One of the nodes (the source node), wants to transfer one gigabyte of data to the other node (the destination node). The source node creates a virtual memory object and registers one gigabyte of data with the memory. The source then provides a path name to the destination node. The destination node opens the virtual memory object using file system commands from a file system API and issues parallel reads to pull the memory locally. Once the operation is finished, the virtual memory object is closed.

As another example, a plurality of processes may be running on two different nodes (e.g., a source node and a destination node). One of the nodes (the source node) wants to transfer one gigabyte of data to the other node (the destination node). The source node requests that the destination node creates a virtual memory object of a given size (e.g., one gigabyte). In response to the request, the destination node generates the virtual memory object, binds one or more physical memory blocks to the virtual memory object, and generates a path to the virtual memory object. The destination node then provides the path to the source node. The source node opens the virtual memory object using file system commands from a file system API and issues parallel writes to enable the data transfer. Once the operation is finished, the virtual memory object is closed.

One or more embodiments of the present disclosure may also be utilized by one or more messaging protocols that want to exchange a large quantity of messages with small amounts of data. Although the messages are typically small in size, embodiments of the present disclosure may be used to transfer the large quantity of messages more efficiently.

Figure 3:
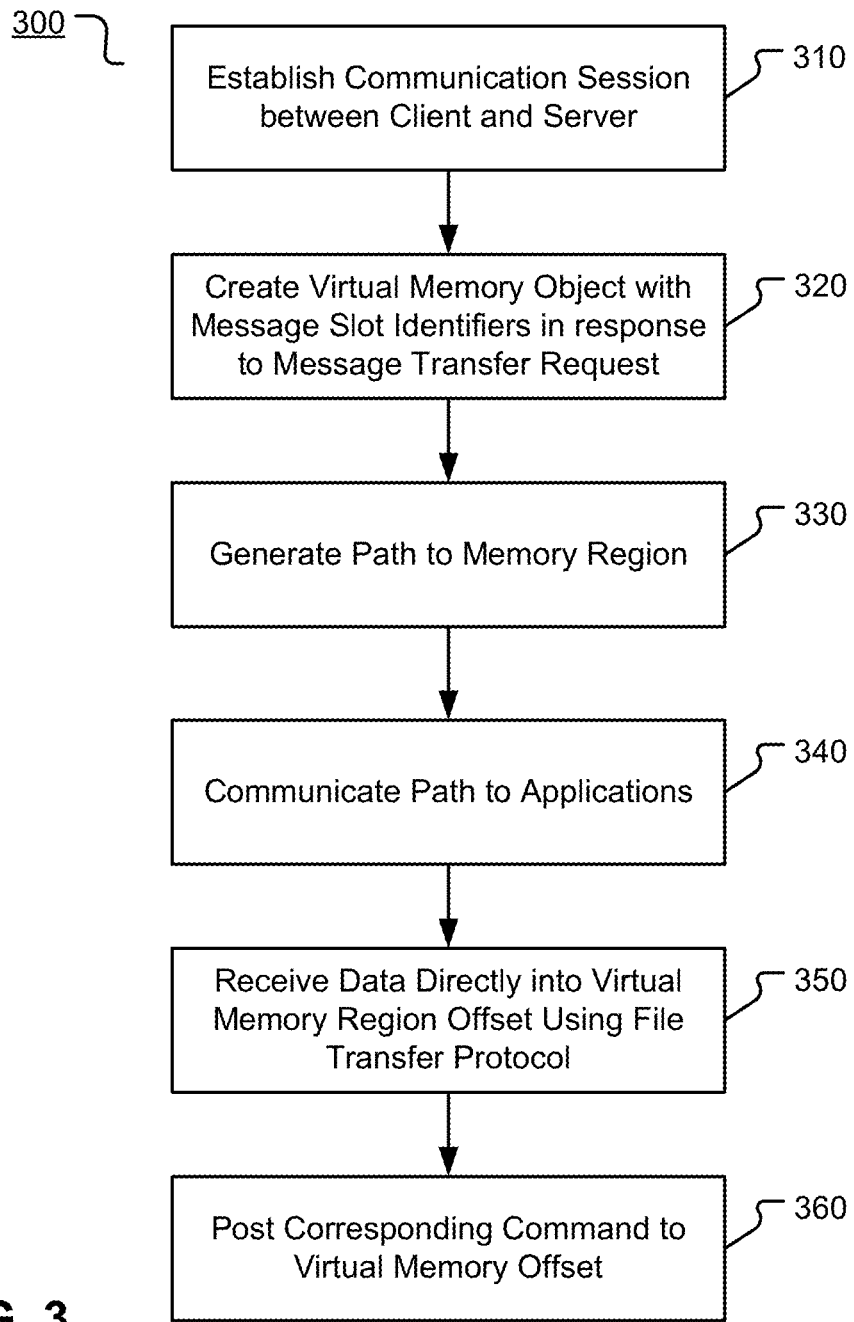
FIG. 3 illustrates a method for exchanging messages between a first computing device and a second computing device according to one or more embodiments of the present disclosure.

Referring to FIG. 3, FIG. 3 illustrates a method 300 for enabling the transfer of messages between a first computing device and a second computing device. In embodiments, the transfer of messages may be between the first computing device 110 (FIG. 1) and the second computing device 150 (FIG. 1). Method 300 begins when a communication session is established 310 between a client and a server. In certain embodiments, the communication session is based on the TCP/IP communication protocol or other such communication protocol.

When the server receives a message transfer request from the client, the server creates 320 a virtual memory object. In certain embodiments, the virtual memory object is mapped to one or more physical memory locations of the server. Additionally, each memory location is associated with one or more offsets that are used as message slot identifiers.

Once the virtual memory object has been created, flow proceeds to operation 330 in which a path to the virtual memory object is generated. The path is then communicated 340 to the client device and/or to one or more applications resident on the client device using the established communication session of operation 310.

Once the path has been communicated to the one or more applications, data from the client application is received directly into an offset of the physical memory location associated with the virtual memory object. In embodiments, the data is directly received into the offset using a file transfer protocol such as, for example, the SMB2 or SMB3 protocol. Flow then proceeds to operation 360 in which the server, or in which an application running on the server, posts a corresponding command to the physical memory offset that received the message from the client application.

For example, using the method 300 described above, once the virtual memory object is created and the path transmitted to a client, the client may post any read or write to any offset in the virtual memory. Once the command is received and stored in the offset, the server posts a corresponding read or write to the same offset. Each of the commands are paired and processed. Furthering the example, the client may post a write using a file system API to offset 1 in the virtual memory object. In response, the server posts a corresponding read to offset 1 in the virtual memory object. The write from the client and the read from server are paired and processed and the data from the client's write is written directly to the physical memory associated with the offset of the virtual memory object via the server's corresponding read. It is also contemplated that messages may be sent in the opposite fashion (i.e., a client posts a read, and the server sends a corresponding write).

One or more embodiments provide that writes and reads using the above described method may be processed in parallel. For example, a client device may send out 100 writes that are written in offsets 1-100 of the virtual memory object (assuming that the order of processing does not matter to the client). Additionally, the server may have posted 1000 reads in offsets 1-1000 of the virtual memory object. As each write from the client is received, the server can immediately process 100 of 1000 reads that are posted and write the data accordingly. Because each of the reads and writes have corresponding identifiers (i.e., the offsets to the memory locations) the client and server know which commands have been processed. Additionally, the server can also ensure that a write only occurs once for a given offset by failing subsequent writes to that offset. Thus, if the client loses connectivity, then subsequently re-establishes and re-opens the object and replays the write, the write will only be processed once by the server.

One or more embodiments provide that the method 200 and the method 300 may be combined. That is, a virtual file may be generated where a first portion of the memory is used to receive and store messages in memory offsets and where a second portion of the memory is used to store blocks of data. In such embodiments, when data is received, a particular bit may be set to indicate that the data is a message and should have access to a particular offset in the memory (as discussed with respect to FIG. 3). In this example, if the bit is not set, the data should be written to a particular memory location (as discussed with respect to FIG. 2).

Embodiments of the present disclosure may also be used to perform live migration of a virtual machine from a first physical computing device to a second physical computing device without shutting down the virtual machine. In certain embodiments, a virtual machine is resident on a partition of a physical machine. The virtual machine may run an operating system and one or more additional applications. It is also contemplated that one physical machine may have a plurality of virtual machines.

Figure 4:
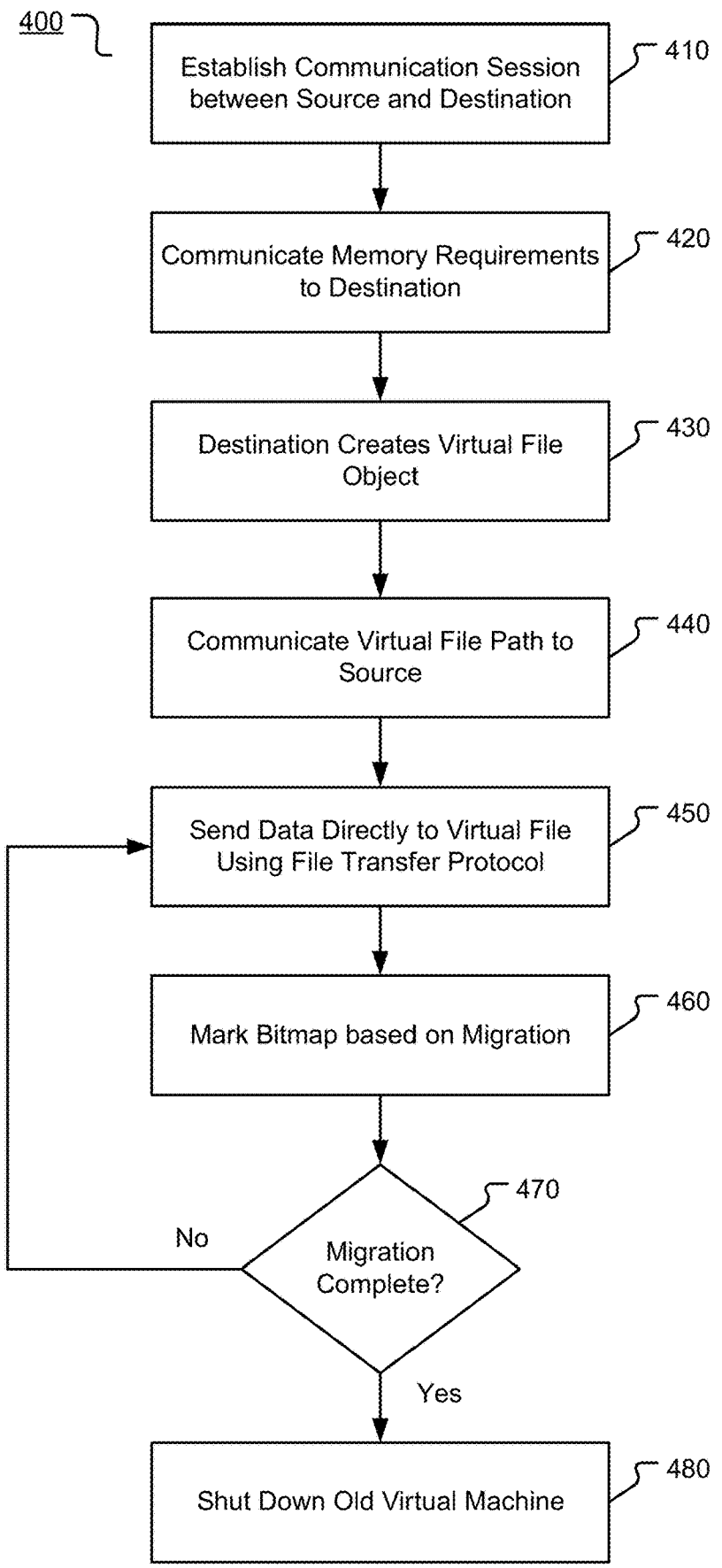
FIG. 4 illustrates a method for migrating a virtual machine from a source to a destination according to one or more embodiments of the present disclosure.

FIG. 4 illustrates a method 400 for performing live migration of a virtual machine from a source to a destination. In certain embodiments, a communication session is established 410 between the source and the destination. The communication between the source and the destination is established using a TCP/IP communication protocol or other communication protocol. In certain embodiments, the source may be the second computing device 150 and the destination may be the first computing device 150 discussed with respect to FIG. 1 above. In certain embodiments, the virtual machine is being executed at the source at the time it is to be transferred. As data may continuously be written to the virtual machine during the transfer, the virtual machine is not be shut down as any disruptions in service may corrupt data, or render the transferred virtual machine inoperable.

Once the communication between the source and the destination is established, the source determines one or more features of the virtual machine that is to be transferred. These details may include the intended use of the virtual machine, one or more network connections associated with the virtual machine, the size of the virtual machine (i.e., how much memory will the virtual machine require once the migration from the source to the destination is complete) etc. When the features of the virtual machine have been established, the source communicates the memory requirements to the destination over the established communication session.

In response, the destination creates 430 a virtual file object. In certain embodiments, the size of the virtual file object corresponds to that of the established memory requirements. Thus, if the virtual machine required two gigabytes of data, the virtual file object is established as two gigabytes in size. As with the other embodiments described herein, once the virtual file object is created, one or more physical memory blocks of the destination are bound to the virtual file object. In certain embodiments, the virtual file object created on the destination matches the configuration of the memory used by the virtual machine on the source. Additionally, the virtual file object on the destination will eventually be used by the destination as the memory for the virtual machine. Such a configuration enables full leverage of zero-copy transfer with RDMA.

In certain embodiments, the destination may also create one or more security parameters for the virtual object. The destination may also generate a path that is associated with the virtual file object. As discussed above, the path is utilized by the source to access the virtual file object and more specifically the physical memory of the destination to which the virtual file object points.

Once the path is created, the path name is communicated to the source 440. In certain embodiments, the path is communicated to the source using the previously established communication session.

Flow then proceeds to operation 450 in which the source initiates the copying of the virtual machine directly to the virtual file using file system commands over a file access protocol, such as, for example, a version of the SMB protocol. More specifically, the source copies data from one or more local blocks of data and, using file system commands from a file system API known to the source, transmits a write request over the file access protocol to the virtual file using the path name. As discussed above, one or more embodiments provide that the layout of the memory object created on the destination matches the layout used by the virtual machine on the source. This allows the source to derive the file offset for the write operations from the virtual machine's memory locations on source host.

In certain embodiments, the commands from the source to the destination are asynchronous write commands. Additionally, as discussed, the file transfer protocol supports multi-channel capabilities. Accordingly, a plurality of asynchronous writes may be performed simultaneously or substantially simultaneously. As with other data transfers disclosed herein, the data transfer between the source and destination (and between the destination and source) of operation 450 may be a zero copy data transfer using RDMA.

In certain embodiments, essential portions (e.g., required components needed for the execution of the virtual machine) of the virtual machine are migrated from the source to the destination before non-essential portions of the virtual machine are migrated from the source to the destination. In other embodiments, the virtual machine is migrated in sequence. Once enough portions of the virtual machine have been transferred to the destination to enable the virtual machine to run, the virtual machine may begin executing at the destination. Thereafter, any read or writes to and from the virtual machine may be handled by the newly stated virtual machine.

As discussed, the virtual machine may be executing during the file transfer progress and data may continuously be written to the memory of the virtual machine. As such, method 400 proceeds to operation 460 in which a bitmap is maintained at the source. In certain embodiments, the virtual machine may update the bitmap. In another embodiment, the bitmap may be maintained by the source. In certain embodiments, each bit in the bitmap represents a memory portion of the virtual machine being transferred. Thus, the bitmap tracks which portions of the virtual machine have been transferred to the destination and further, which of the transferred portions have been updated data since the corresponding portion was migrated. For example, each modification of the memory portion results in a corresponding bit of the bitmap being set. Thus, if a portion of the virtual machine had been migrated and then data hosted by that portion was subsequently changed, the bitmap would show that the data had subsequently changed and that portion of the data should be migrated again.

In certain embodiments, the virtual machine is migrated using a multi-pass approach. Thus, after each pass is complete (up to a maximum number of passes), the bitmap is checked to determine 470 whether the migration is complete. If the migration is not complete, flow passes back to operation 450 and the process repeats. However, if it is determined in operation 470 that the migration is complete, the bitmap is checked for any final changes to the data. If there have been changes to the data, the updated data is sent to the destination and the virtual machine on the source is shut down.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the present disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
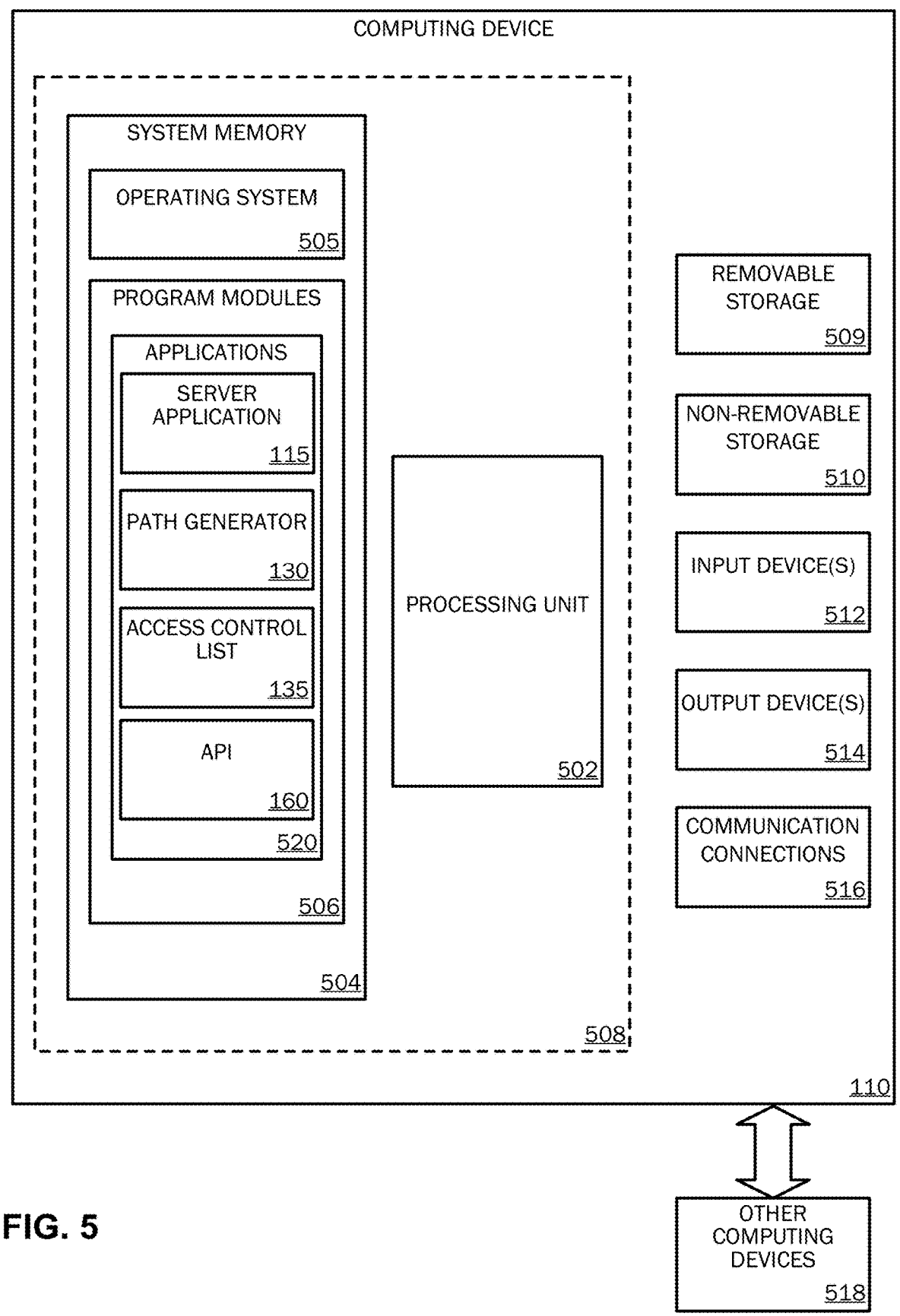
FIG. 5 is a block diagram illustrating example physical components of a computing device that may be used with one or more embodiments of the present disclosure.
Figure 6A:
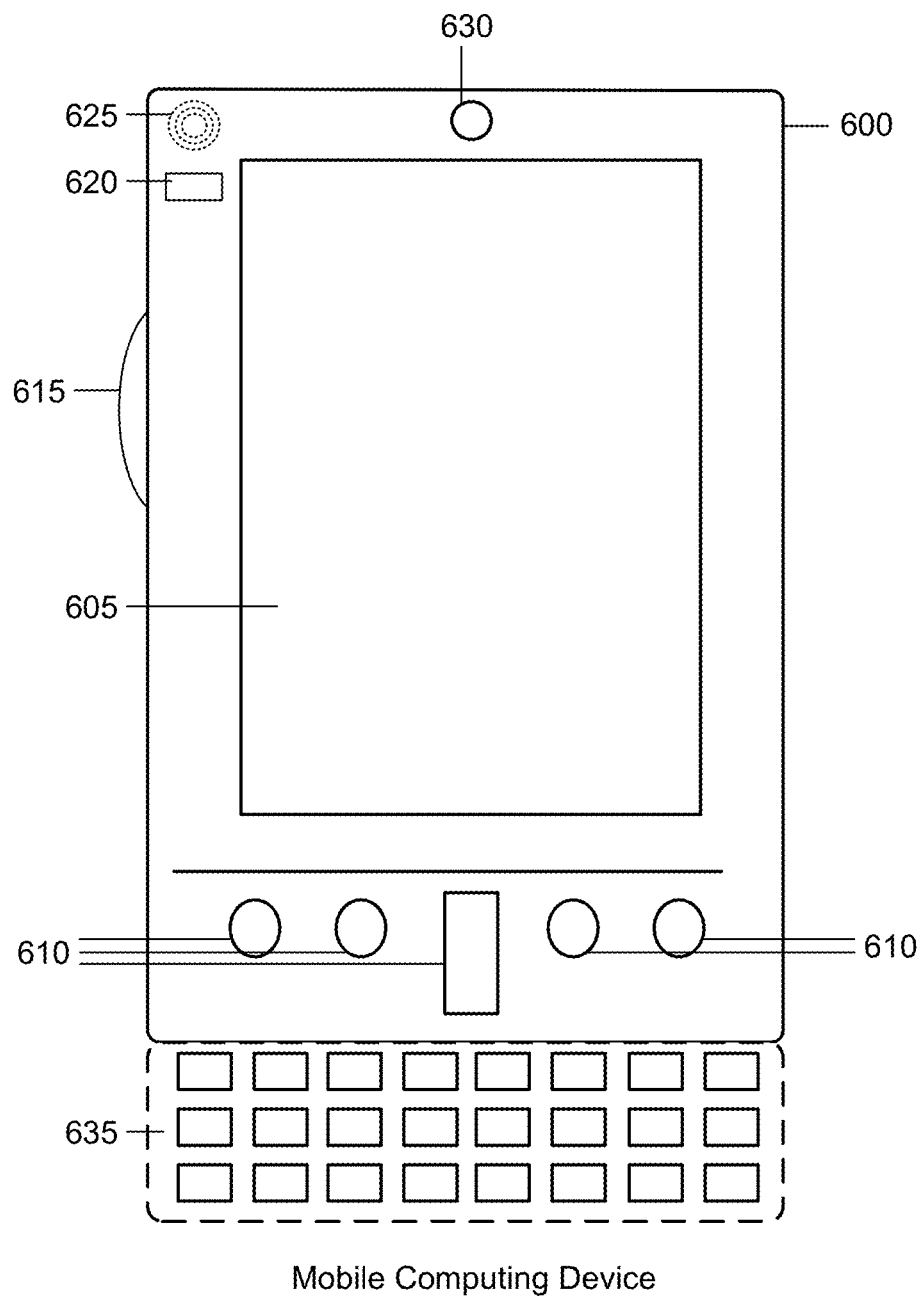
FIGS. 6A and 6B are simplified block diagrams of a mobile computing device that may be used with one or more embodiments of the present disclosure.
Figure 6B:
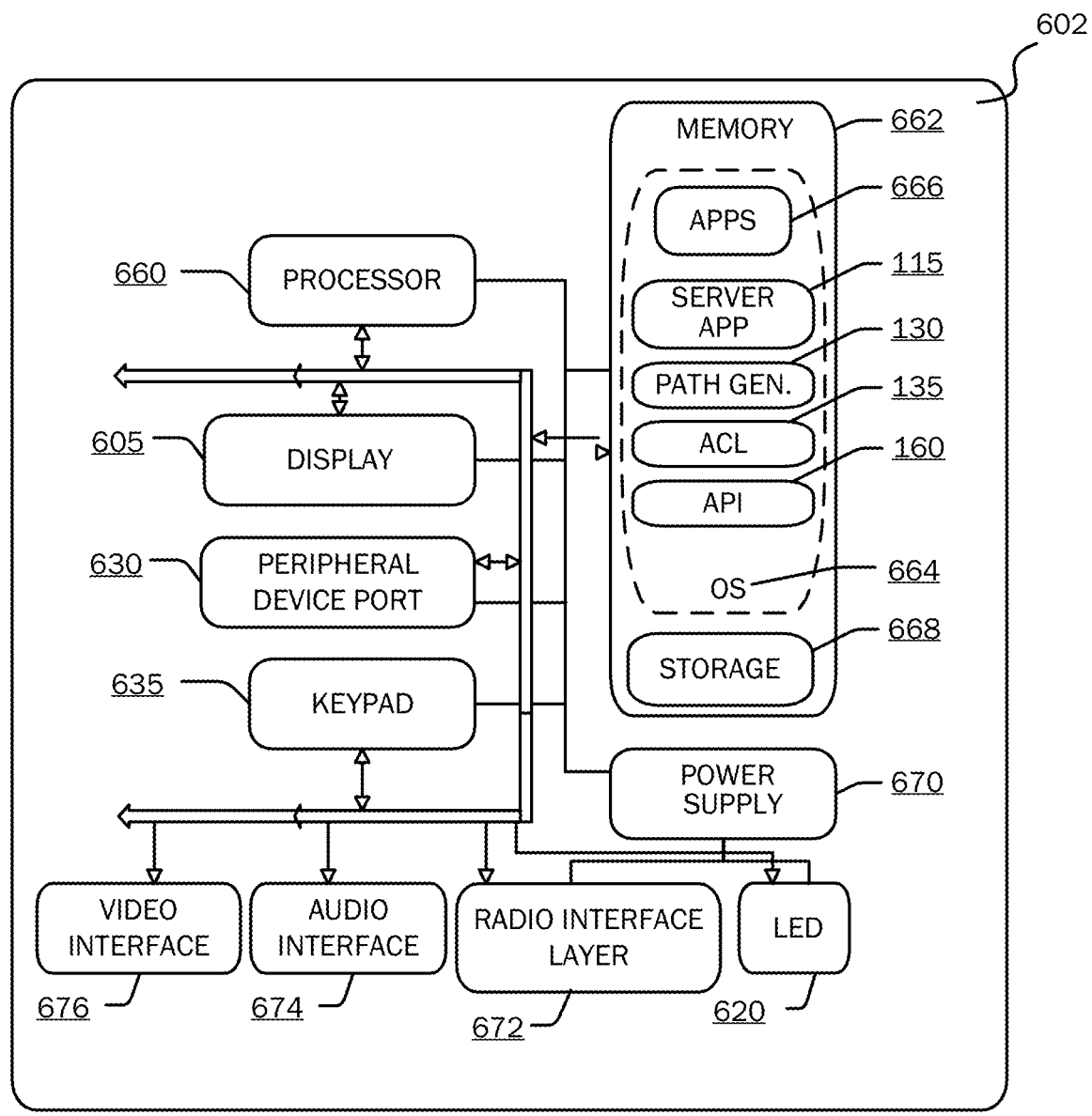
Figure 7:
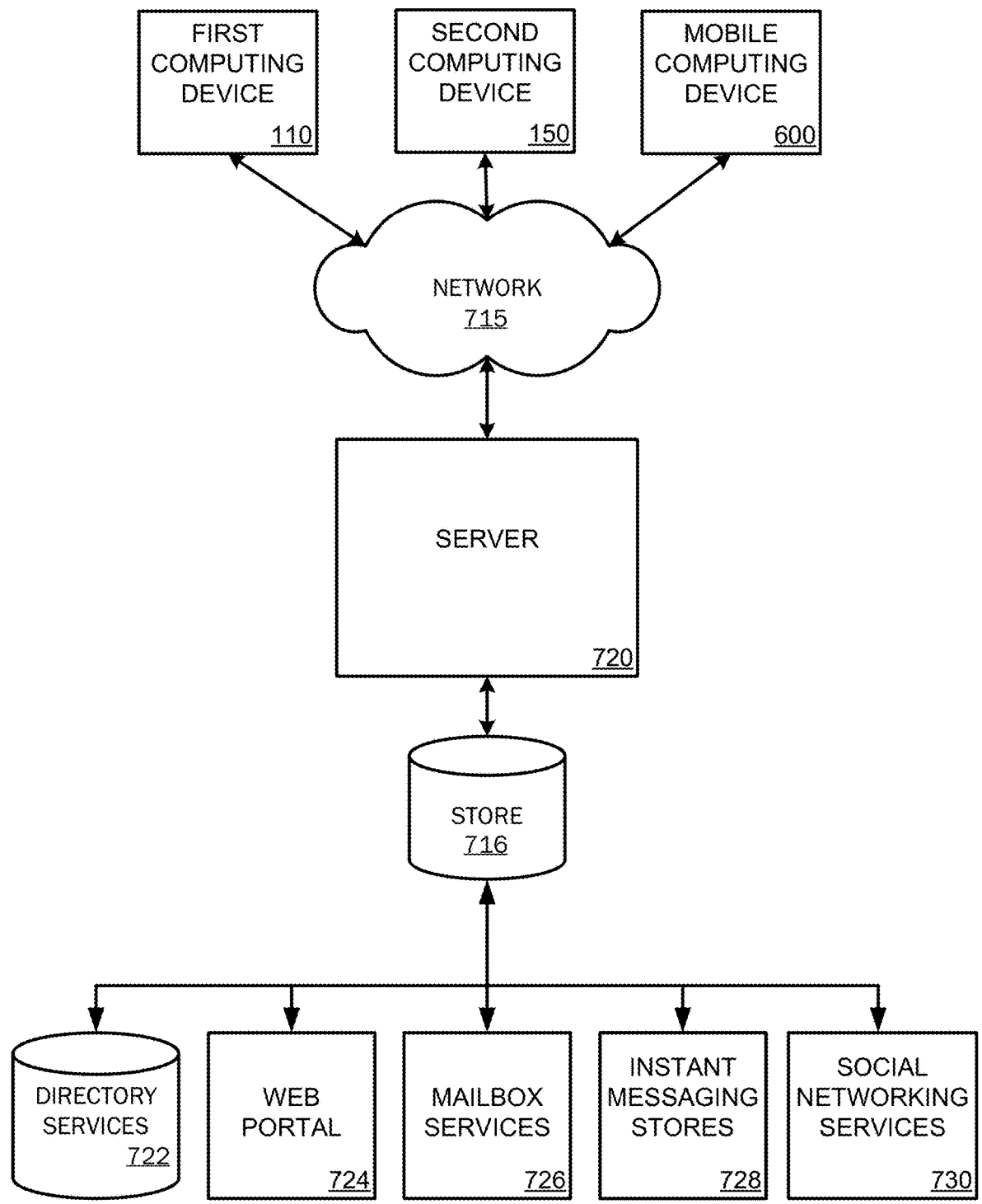
FIG. 7 is a simplified block diagram of a distributed computing system that may be used with one or more embodiments of the present disclosure.

FIGS. 5-7 and the associated descriptions provide a discussion of a variety of operating environments in which embodiments of the present disclosure may be practiced. However, the devices and systems illustrated and discussed with respect to FIGS. 5-7 are for purposes of example and illustration and are not limiting of a vast number of computing device configurations that may be utilized for practicing embodiments described herein.

FIG. 5 is a block diagram illustrating physical components (i.e., hardware) of a computing device 110 with which embodiments of the present disclosure may be practiced. The computing device components described below may be suitable for the computing devices described above including the first computing device 110 and the second computing device 150. In a basic configuration, the computing device 110 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 520 such as the server application 115, the path generator 130, the access control list 135, and the API 160 (in embodiments where the computing device represents the second computing device 150). The operating system 505, for example, may be suitable for controlling the operation of the computing device 110. Furthermore, embodiments of the present disclosure may be practiced in conjunction with a graphics library, other operating systems, or any other application program and is not limited to any particular application or system. This basic configuration is illustrated in FIG. 5 by those components within a dashed line 508. The computing device 110 may have additional features or functionality. For example, the computing device 110 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, but not limited to, one or more of the stages of the methods 200, 300 and 400 illustrated in FIGS. 2-4. Other program modules that may be used in accordance with embodiments of the present disclosure may include electronic mail and contacts applications, word processing applications, spreadsheet applications, database applications, slide presentation applications, drawing or computer-aided application programs, etc.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the present disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the server application 115, the path generator 130, the access control list 135 and the API 160 may be operated via application-specific logic integrated with other components of the computing device 110 on the single integrated circuit (chip). Embodiments of the present disclosure may also be practiced using other technologies capable of performing logical operations such as, for example, AND, OR, and NOT, including but not limited to mechanical, optical, fluidic, and quantum technologies. In addition, embodiments of the present disclosure may be practiced within a general purpose computer or in any other circuits or systems.

The computing device 110 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 104 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 110. Any such computer storage media may be part of the computing device 110. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which embodiments of the present disclosure may be practiced. With reference to FIG. 6A, one embodiment of a mobile computing device 600 for implementing the embodiments is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative embodiments, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some embodiments, the mobile computing device 600 incorporates a vibration transducer for providing the user with tactile feedback. In yet another embodiment, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one embodiment of a mobile computing device. That is, the mobile computing device 600 can incorporate a system (i.e., an architecture) 602 to implement some embodiments. In one embodiment, the system 602 is implemented as a "smart phone" capable of running one or more applications (e.g., browser, e-mail, calendaring, contact managers, messaging clients, games, and media clients/players). In some embodiments, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including the server application 115, the path generator 130, the access control list 135, and the API 160 (in embodiments where the computing device 600 represents the second computing device 150) described herein.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one embodiment of the architecture of a system for transferring data between different computing devices as described above. The data transferred between the first computing device 110 and the second computing device 150 may be stored in different communication channels or other storage types. For example, various documents may be stored using a directory service 722, a web portal 724, a mailbox service 726, an instant messaging store 728, or a social networking site 730. The server application 115, the path generator 130 and the access control list 135 may use any of these types of systems or the like for enabling the methods and features described herein. A server 720 may provide data to and from the first computing device 110 and the second computing device 150. As one example, the server 720 may be a web server. The server 720 may provide data to either the first computing device 110 or the second computing device 150 over the web through a network 715. By way of example, the first computing device 110 and the second computing device 150 may be embodied in a personal computer, a tablet computing device and/or a mobile computing device 600 (e.g., a smart phone). Any of these embodiments may obtain content from the store 716.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the present disclosure as claimed in any way. The embodiments, examples, and details provided in this application are considered sufficient to convey possession and enable others to make and use the best mode of the claimed embodiments. The claimed embodiments should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed embodiments.

We claim:

1. A method for transferring data between a first computing device and a second computing device, the method comprising:
    establishing a communication session between the first computing device and the second computing device;
    creating a virtual memory object on the first computing device, wherein the virtual memory object is configured such that data may be written to one or more physical memory blocks of the first computing device associated with the virtual memory object using file system commands;
    binding the virtual memory object to the one or more physical memory blocks of the first computing device;
    generating a path to the virtual memory object;
    transmitting the path to the second computing device using the communication session; and
    accepting data from the second computing device directly into a memory buffer associated with the one or more physical memory blocks of the first computing device using the virtual memory object.

2. The method of claim 1, wherein the first communication protocol is a Transmission Control Protocol (TCP).

3. The method of claim 1, wherein accepting the data from the second computing device comprises receiving the data over a Server Message Block (SMB) protocol.

4. The method of claim 1, wherein accepting data directly into the virtual memory object comprises accepting the data in parallel over a plurality of channels.

5. The method of claim 1, wherein accepting data directly into the virtual memory object comprises accepting one or more file system commands from the second computing device, wherein the one or more file system commands are selected from a file system application programming interface (API).

6. The method of claim 1, wherein the one or more physical memory blocks are in contiguous.

7. The method of claim 1, wherein the one or more physical memory blocks are either: (i) non-contiguous, or (ii) backed by a mix of virtual memory and physical storage.

8. A method for transferring data between a first computing device and a second computing device, the method comprising:
    establishing a communication session between the first computing device and the second computing device;
    sending, to the first computing device, a request to transfer data from the second computing device to the first computing device;
    in response to the request, receiving, at the second computing device, a path to a virtual memory object, wherein the virtual memory object is configured such that data may be written to one or more physical memory blocks of the first computing device associated with the virtual memory object using file system commands, and further wherein the virtual memory object is bound to one or more physical memory blocks on the first computing device;
    transferring, by the second computing device, data directly to a memory buffer associated with the one or more physical memory blocks using the virtual memory object, wherein the data is transferred to the one or more physical memory blocks using the virtual memory object by a file system command communicated by the second computing device.

9. The method of claim 8, wherein the first communication protocol is a Transmission Control Protocol (TCP).

10. The method of claim 8, wherein the data is a virtual machine that is being executed on the second computing device.

11. The method of claim 8, wherein transferring the data comprises transferring the data over a Server Message Block (SMB) protocol.

12. The method of claim 8, wherein the data is transferred over a second communication protocol, and the second communication protocol utilizes multiple channels to transfer the data between the first computing device and the second computing device.

13. The method of claim 8, wherein file system command is selected from a file system application programming interface (API).

14. The method of claim 8, wherein the one or more physical memory blocks are contiguous.

15. The method of claim 8, wherein the one or more physical memory blocks are either: (i) non-contiguous, or (ii) backed by a mix of virtual memory and physical storage.

16. A computer storage media encoding computer executable instructions which, when executed by one or more processors, cause the one or more processors to perform a method for transferring data between a first computing device and a second computing device, the method comprising:
    establishing a communication session between the first computing device and the second computing device;
    creating a virtual memory object on the first computing device, wherein the virtual memory object is configured such that data may be written to one or more physical memory blocks of the first computing device associated with the virtual memory object using file system commands;
    binding the virtual memory object to the one or more physical memory blocks of the first computing device;
    generating a path to the virtual memory object;
    transmitting the path to the second computing device using the communication session; and
    accepting data from the second computing device directly into a memory buffer associated with the one or more physical memory blocks of the first computing device using the virtual memory object, wherein accepting data directly into the one or more physical memory blocks of the first computing device comprises accepting data that is communicated to the first computing device over a second communication protocol that is different from the first communication protocol and using one or more file system commands received from the second computing device.

17. The computer storage media of claim 16, wherein the first communication protocol is a Transmission Control Protocol (TCP).

18. The computer storage media of claim 16, wherein second communication protocol is a Server Message Block (SMB) protocol.

19. The computer storage media of claim 16, further comprising instructions for associating one or more security parameters with the path to restrict access to the virtual memory object.

20. The computer storage media of claim 16, wherein the one or more physical memory blocks are either: (i) non-contiguous, or (ii) backed by a mix of virtual memory and physical storage.

* * * * *